US012803210B2

(12) United States Patent
Lin et al.

(10) Patent No.: US 12,803,210 B2
(45) Date of Patent: Nov. 17, 2026

(54) ELECTRICAL CONNECTOR HAVING SPRINGS

(71) Applicant: BIZLINK INTERNATIONAL CORP., New Taipei City (TW)

(72) Inventors: Zhongming Lin, New Taipei City (TW); Chubei Zhang, New Taipei City (TW)

(73) Assignee: BIZLINK INTERNATIONAL CORP., New Taipei City (TW)

( * ) Notice: Subject to any disclaimer, the term of this patent is extended or adjusted under 35 U.S.C. 154(b) by 364 days.

(21) Appl. No.: 18/586,443

(22) Filed: Feb. 24, 2024

(65) Prior Publication Data

US 2025/0273893 A1 Aug. 28, 2025

(51) Int. Cl.
*H01R 13/42* (2006.01)
*H01R 13/422* (2006.01)

(52) U.S. Cl.
CPC .................................. *H01R 13/422* (2013.01)

(58) Field of Classification Search
CPC ...................................................... H01R 12/43
USPC ........................................ 439/746, 744, 839
See application file for complete search history.

(56) References Cited

U.S. PATENT DOCUMENTS 2,838,739 A * 6/1958 Winkler ................ H01R 13/26 439/295
4,386,818 A * 6/1983 Millhimes .......... H01R 13/7175 439/490
5,007,865 A * 4/1991 Jakobeit ................ H01R 13/18 439/856
7,374,460 B1 5/2008 Hariharesan et al.
2014/0193991 A1 7/2014 York et al.

* cited by examiner

*Primary Examiner* — Phuong K Dinh
(74) *Attorney, Agent, or Firm* — CKC & Partners Co., LLC

(57) ABSTRACT

An electrical connector includes a base and a plurality of contact modules. The base has a plurality of tunnels. The contact modules respectively embedded in the tunnels, wherein each of the contact modules includes a contact and a spring. The spring is located in one of the tunnels and supports a contact end of the contact so that the contact end is suspended. A back end of the spring has a fixed portion having a first barb, and the first barb hooks into a stop recess of a first tube wall of one of the tunnels.

19 Claims, 7 Drawing Sheets

ELECTRICAL CONNECTOR HAVING SPRINGS

BACKGROUND

Field of Invention

The present disclosure relates to an electrical connector.

Description of Related Art

Current high-power transmission connectors often use high-conductivity copper, known as red copper, for making terminals that improve electrical conductivity.

Yet, red copper's softness and inadequate fatigue strength can cause it to wear out quickly in plug-in uses, shortening its lifespan.

A common solution is using a spring clip under the soft terminal to help support and distribute the load.

To assemble these, a spring clip is first fitted into a plastic insulating base using fixture(s). Heat is then applied to form protrusions in the base. The terminal is then inserted, held in place by these protrusions, and a groove on the terminal locks with the spring for a secure fit. This method, though, is complicated and often unstable. Moreover, by the said process, the terminal's stability depends on the spring's position within the base, either deformation of terminal or spring may result in the failure of or misalignment occurs, it poses a risk of terminal detachment, adversely affecting product quality.

Additionally, the terminal's stability relies on the spring's exact placement inside the base. If the terminal and spring are not aligned correctly or if either is deformed, the terminal can come loose, affecting the quality of the product.

SUMMARY

According to some embodiments of the present disclosure, an electrical connector includes a base and a plurality of contact modules. The base has a plurality of tunnels. Each of the contact modules includes a contact and a spring. A back end of the spring has a fixed portion having a first barb. The first barb of the spring is hooked into the stop recess of the tunnel of the base for secure, and the spring may have an enclosed ring for allowing the contact to pass through. Moreover, another barb may be formed on the surface of the enclosed ring. By the said design, the product assembly process required thereby can be simplified, making it easy to assemble with high production efficiency, and ensuring a stable product structure with a long service life. The aforementioned configuration has the following advantages. The contact and the spring form the easy-to-assemble contact module, the first barb of the spring inserted into the terminal hole of the base and coupled with the stop recess realizes the assembly and the limiting of the entire contact module, and thus complex manufacturing processes can be decreased to simplify the assembly process of the product. In addition, the spring can not only be used as a limiting fixture between the contact and the base to ensure that the position of the contact in the base is stable, but also can provide elastic support for the contact, so that the contact can indirectly obtain better elasticity, thereby greatly increasing the plugging and unplugging lifespan of the product.

In the aforementioned embodiments of the present disclosure, by combining the terminal and spring clip into an easily assembled terminal module. The module is secured in place within the base by aligning the spring clip's first barb with the terminal hole and a stop groove. This design simplifies the assembly process, reducing complex steps and making it more straightforward. Additionally, the spring serves a dual function that it acts as a positioning and stabilizing component between the terminal and the base, ensuring the terminal remains securely in place, and it provides elastic support to the terminal. This arrangement indirectly enhances the terminal's elasticity, significantly extending the product's plug-in lifespan.

BRIEF DESCRIPTION OF THE DRAWINGS

Aspects of the present disclosure are best understood from the following detailed description when read with the accompanying figures. It is noted that, in accordance with the standard practice in the industry, various features are drawn accurately according to the real scale, so the details such as the proportion and relative relationship of each element should be regarded as a part of the content of the present disclosure.

DETAILED DESCRIPTION

Figure 1:
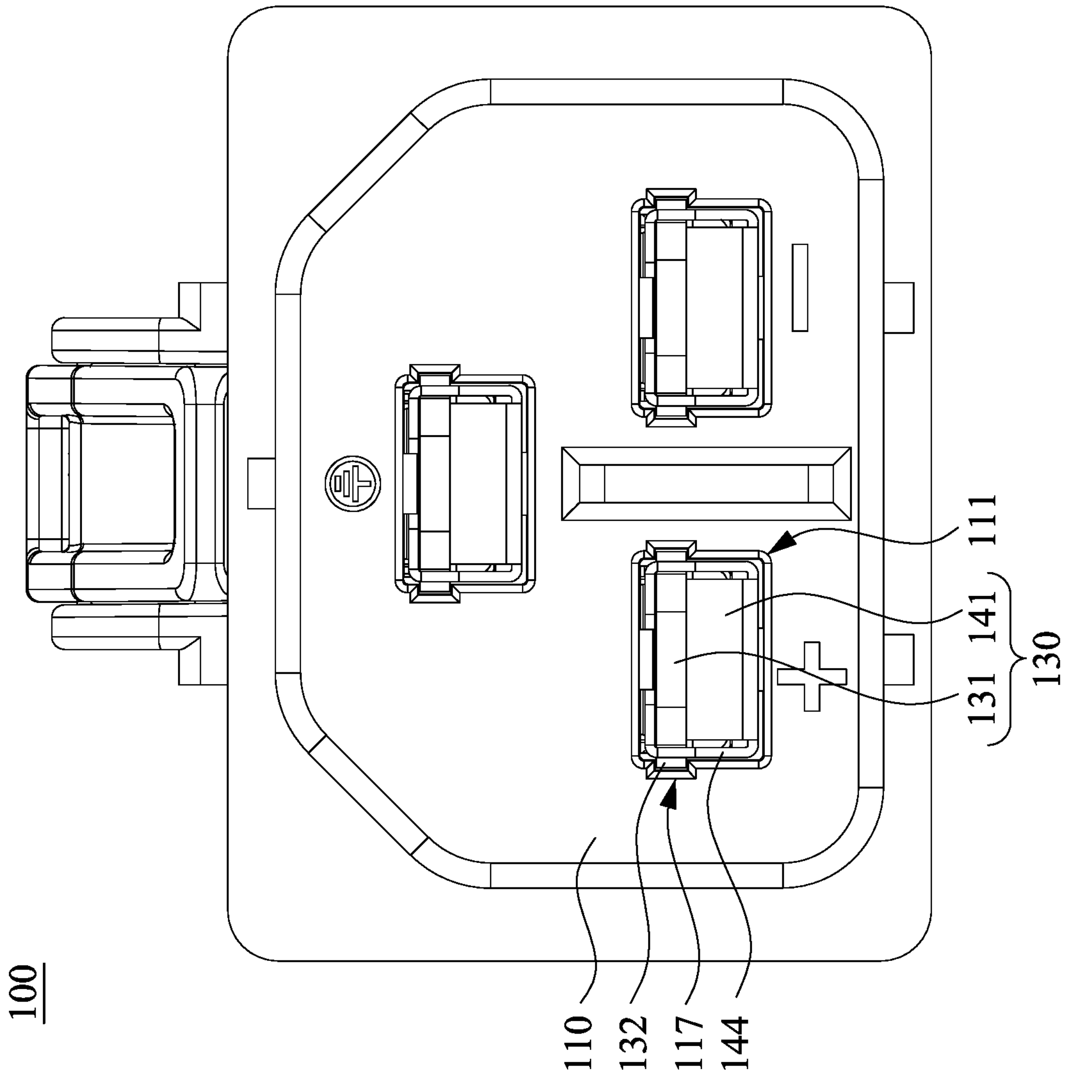
FIG. 1 is a rear view of an electrical connector according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

It is noted that various features are drawn accurately according to the real scale, so the details such as the proportion and relative relationship of each element should be regarded as a part of the content of the present disclosure.

Figure 2:
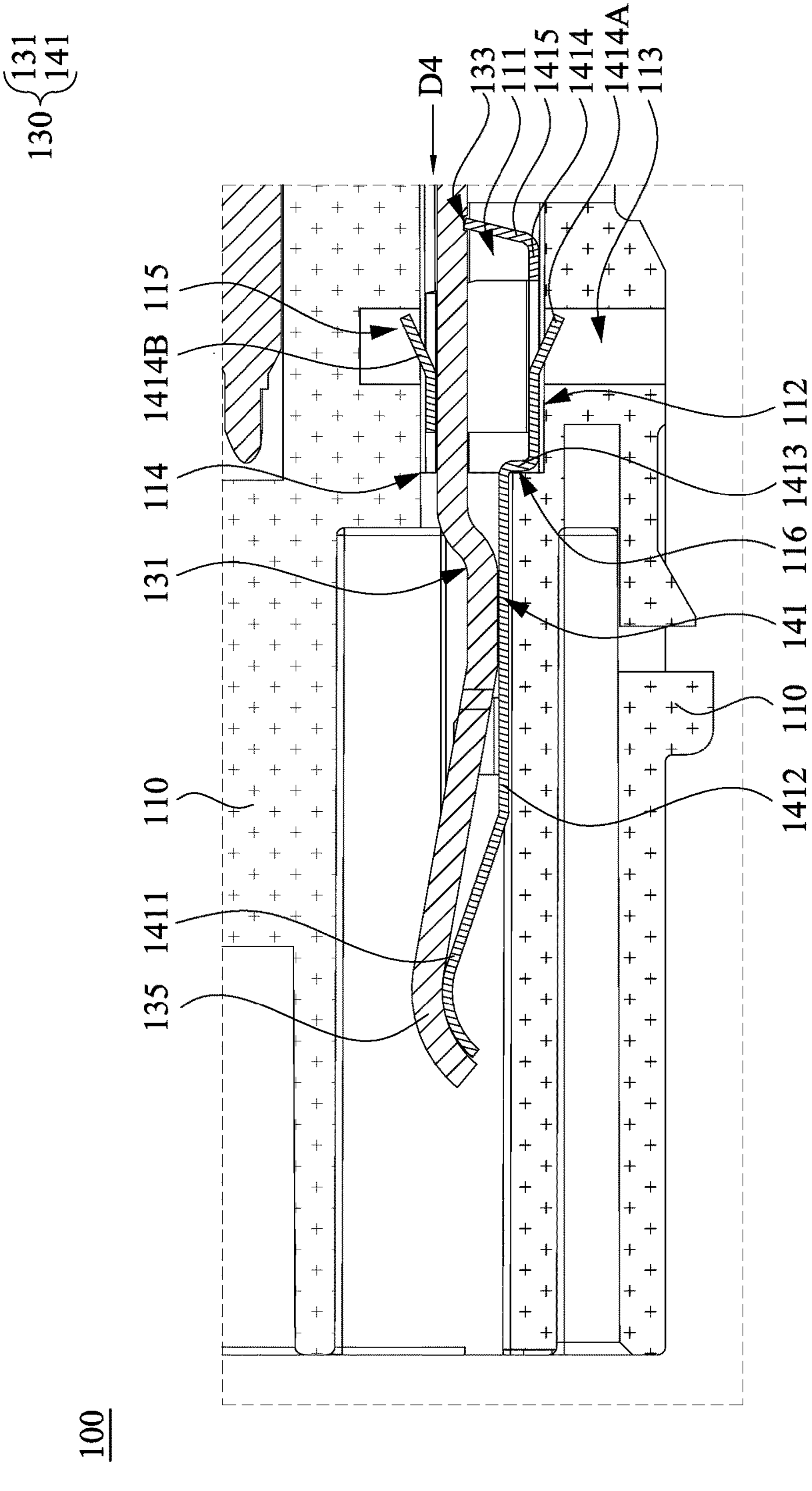
FIG. 2 is a cross-sectional view of the electrical connector of FIG. 1.

FIG. 1 is a rear view of an electrical connector 100 according to one embodiment of the present disclosure. FIG. 2 is a cross-sectional view of the electrical connector 100 of FIG. 1. As shown in FIG. 1 and FIG. 2, the electrical connector 100 may be a high current and high voltage connector, such as an electrical connector capable of transmitting 40 A and 400V power. In this embodiment, the electrical connector 100 is a female connector configured to couple with a mating connector, such as a male connector.

The electrical connector 100 includes a base 110 and plural contact modules 130.

The base 110 is one-piece-formed of electrically insulated material. For example, the base 110 is made of plastic by injection molding. The base 110 has three tunnels 111 arranged in a pyramid shape. Each of the tunnels 111 has a lower first tube wall 112 and an upper second tube wall 114. The first tube wall 112 has a stop recess 113, and the second tube wall 114 has a stop recess 115. In this embodiment, the stop recess 113 is a through hole, and the stop recess 115 is a blind hole. In this embodiment, the stop recess 115 can be concentric to the stop recess 113. In another embodiment, either or both of the said recesses may also be formed at the lateral surfaces instead.

In addition, as depicted in FIG. 2, the base 110 has a step structure 116 in the tunnel 111, and back side opening of the tunnel 111 of the base 110 has two wing-shaped grooves 117 (see FIG. 1) formed on both sides of the opening. Each of the contact modules 130 is respectively embedded in the tunnels 111 of the base 110 respectively.

Figure 3:
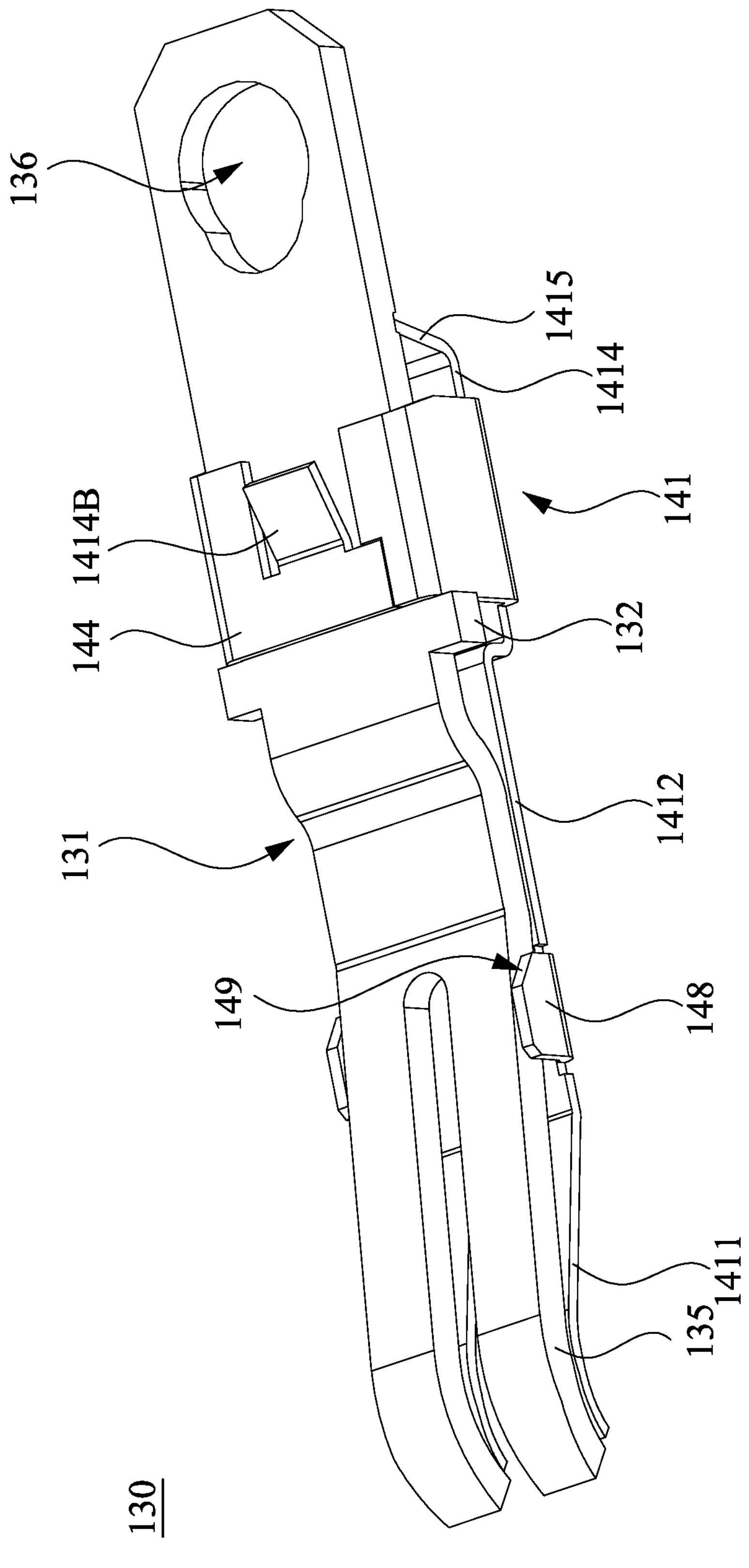
FIG. 3 is a perspective view of a contact module of the electrical connector of FIG. 2.
Figure 4:
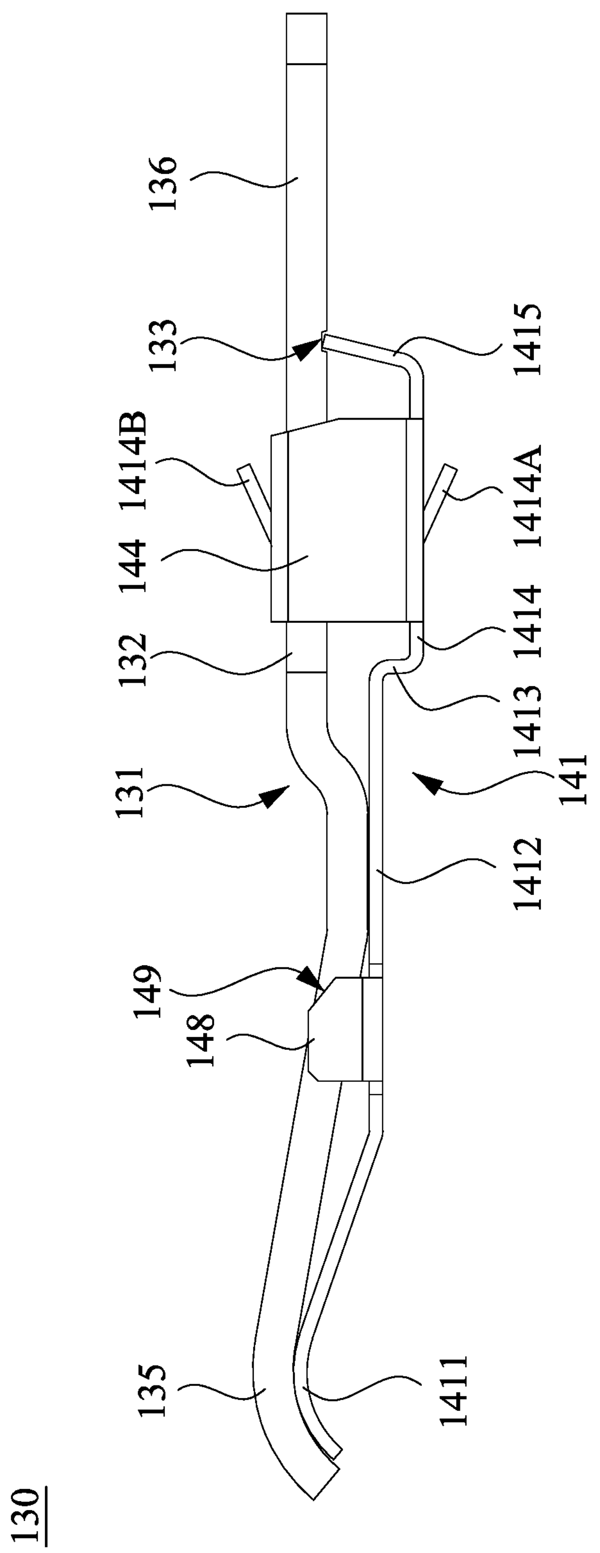
FIG. 4 is a side view of the contact module of FIG. 3.

FIG. 3 is a perspective view of the contact module 130 of the electrical connector 100 of FIG. 2. FIG. 4 is a side view of the contact module 130 of FIG. 3. As shown in FIG. 3 and FIG. 4, the contact module 130 includes a contact 131 and a spring 141. Each of the contact 131 may be one-piece-formed by a metal plate, and be formed of such as red copper.

The contact 131 is fork shaped and has an ear portion 132 and a positioning recess 133. The ear portions 132 protrude from the lateral surface/sidewall of the contact 131 respectively. The positioning recess 133 forms on the bottom surface of a back end thereof as depicted by FIG. 4.

The contact end 135 of the contact 131 has a curved structure. In the following description, the front end and the back end of the contact module 130 are respectively referred to as the left side and the right side of the contact module 130 shown in FIG. 4. As depicted in FIG. 3, the back end of the contact 131 has a through hole 136 for electrically connecting a wire (e.g., by soldering).

The spring 141 is one-piece-formed by a metal material with high strength, for example, SUS301-H stainless steel. The spring 141 is integrally formed as a single piece by a punching process or a stamping process.

The spring 141 from the front end to the back end, in sequence, has a contact portion 1411, an extending portion 1412, a turning portion 1413, a fixed portion 1414, and a tail portion 1415.

The front end of the spring 141 includes the contact portion 1411, and the spring 141 includes the extending portion 1412 behind the contact portion 1411. In this embodiment, the contact portion 1411 of the spring 141 has a fork shape with a slot to correspond to the shape of the contact end 135 of the contact 131. The formation of the slot is optional, and the contact portion 1411 of the spring 141 may have a continuous surface without the slot in another embodiment.

The contact portion 1411 of the spring 141 has a curved structure. Each of two sides of the extending portion 1412 of the spring 141 has a side wing 148, and the back of the side wing 148 has a guiding surface 149. The spring 141 includes the turning portion 1413 behind the extending portion 1412. The back of the turning portion 1413 connects the fixed portion 1414. Therefore, the spring 141 includes the contact portion 1411 included by the front end of the spring 141, the extending portion 1412, the turning portion 1413, and the fixed portion 1414 in sequence.

The back end of the spring 141 has the fixed portion 1414 having a first barb 1414A. The fixed portion 1414 is in a form of an enclosed ring 144. The surface of the fixed portion 1414 in the form of the enclosed ring 144 facing away from the first barb 1414A has a second barb 1414B. In this embodiment, the second barb 1414B is substantially aligned with the first barb 1414A along a vertical direction. Moreover, the fixed portion 1414 of the spring 141 is lower than the extending portion 1412 of the spring 141.

In addition, the back of the fixed portion 1414 connects the tail portion 1415 of the spring 141. In this embodiment, the tail portion 1415 of the spring 141 extends upward, such as an inclined sidewall.

It is to be noted that the connection relationships, the materials, and the advantages of the elements described above will not be repeated in the following description. In the following description, other connection relationships between different elements and the assembling steps of the electrical connector 100 will be explained.

Figure 5:
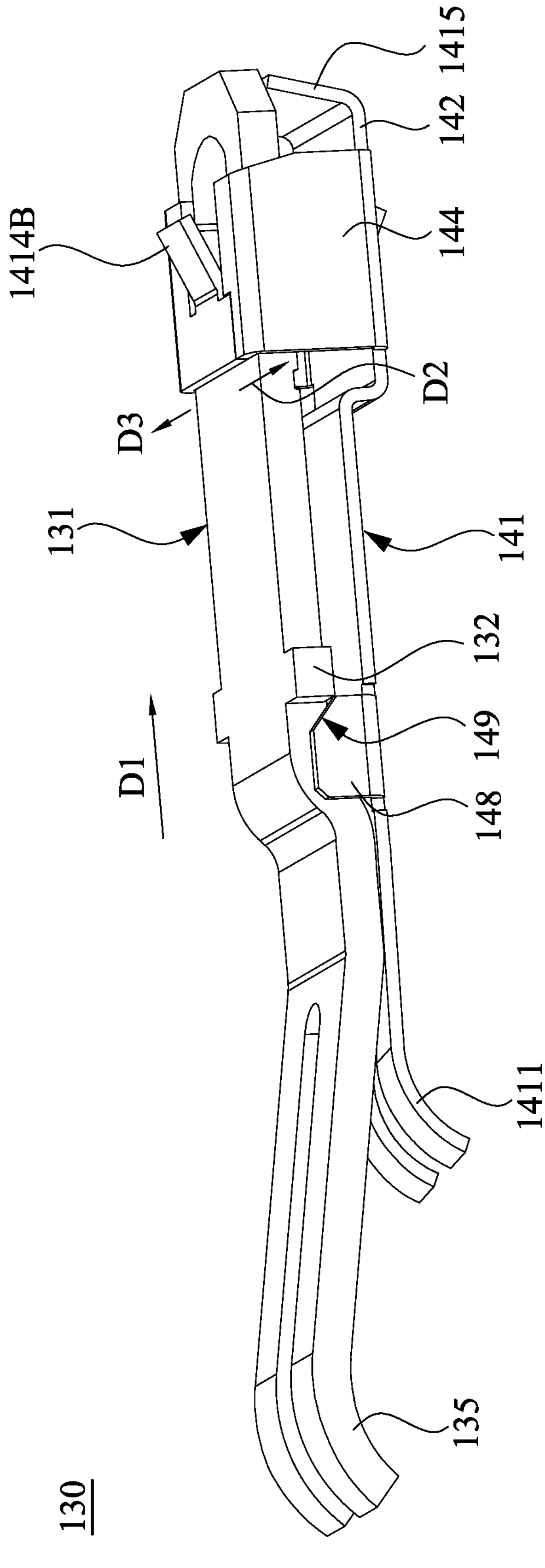
FIG. 5 is a schematic view of a contact and a spring of the contact module of FIG. 4 during assembling.
Figure 6:
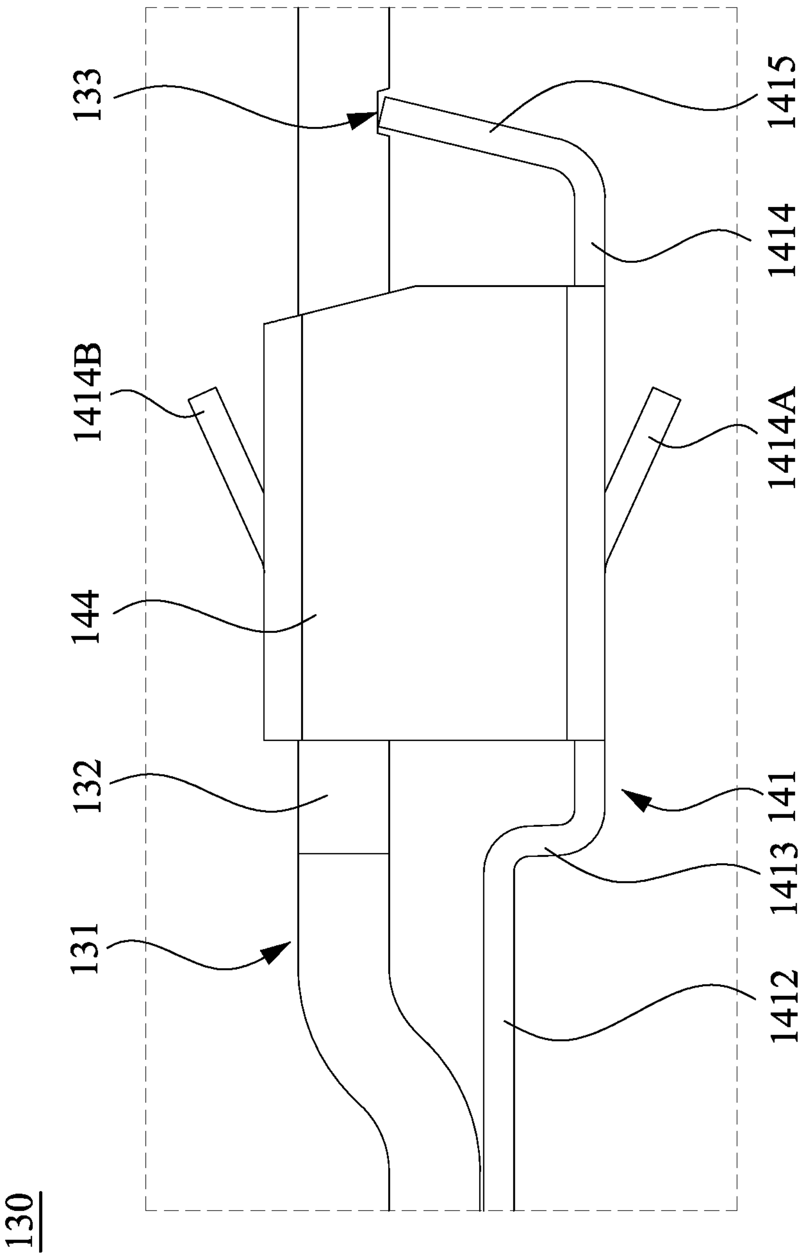
FIG. 6 is a partially enlarged view of the contact module of FIG. 4.

FIG. 5 is a schematic view of the contact 131 and the spring 141 of the contact module 130 of FIG. 4 during assembling. FIG. 6 is a partially enlarged view of the contact module of FIG. 4. As shown in FIG. 5 and FIG. 6, the enclosed ring 144 of the spring 141 forms a channel to enable the contact 131 to pass through. Thereafter, the contact 131 can be pushed in a direction D1 to slide along the spring 141 until the tail portion 1415 of the spring 141 extends upward into the positioning recess 133 of the surface of the contact 131. The side wing 148 and the enclosed ring 144 of the spring 141 prevent the contact 131 from shifting in directions D2 and D3. In this state, the ear portion 132 of the contact 131 abuts against the sidewall of the fixed portion 1414 in the form of the enclosed ring 144, and the curved structure of the contact portion 1411 of the spring 141 abuts against the curved structure of the contact end 135 of the contact 131. The ear portion 132 of the contact 131 abutting against the enclosed ring 144 of the spring 141 and the tail portion 1415 of the spring 141 extending into the positioning recess 133 of the contact 131 prevent the contact 131 from shifting in the direction D1. In this embodiment, the bottom curved surface of the contact end 135 of the contact 131 is disposed along the top curved surface of the contact portion 1411 of the spring 141. The spring 141 supports the contact end 135 of the contact 131 so that the contact end 135 is suspended.

Referring back to FIG. 1 and FIG. 2, after the contact 131 is assembled to the spring 141 to form the contact module 130, the contact module 130 is inserted into the opening of the tunnel 111 of the base 110, and the groove 117 of the base 110 corresponds to the shape of the ear portion 132 of the contact 131, such that the ear portion 132 of the contact 131 can be coupled with the groove 117 of the base 110. The ear portion 132 and the groove 117 can facilitate the positioning of the contact module 130 within the base 110. Thereafter, the spring 141 is located in the tunnel 111 of the base 110, the first barb 1414A hooks into the stop recess 113 of the first tube wall 112 of the tunnel 111, and the second barb 1414B hooks into the stop recess 115 of the second tube wall 114 of the tunnel 111. In other words, the position of the stop recess 113 corresponds to the position of the first barb 1414A, and the position of the stop recess 115 corresponds to the position of the second barb 1414B. As a result, the position of the contact module 130 is limited by the first barb 1414A, the second barb 1414B, and the two stop recesses 113 and 115.

In this state, the contact portion 1411 of the spring 141 suspended from the bottom wall (e.g., the first tube wall 112) of the tunnel 111, the extending portion 1412 of the spring 141 is at least flat against the bottom wall of the tunnel 111, the turning portion 1413 of the spring 141 corresponds to the step structure 116 of the base 110, and the fixed portion 1414 of the spring 141 is partially flat against the first tube wall 112. The turning portion 1413 and the step structure 116 can facilitate the positioning of the contact module 130 within the base 110 in a direction D4. In this embodiment, the shape of the turning portion 1413 corresponds to the shape of the step structure 116, such that the turning portion 1413 of the spring 141 can be disposed along the step structure 116 of the base 110. In addition, the side wing 148 of the extending portion 1412 of the spring 141 extends in a direction away from the first tube wall 112 (i.e., in an upward direction).

Figure 7:
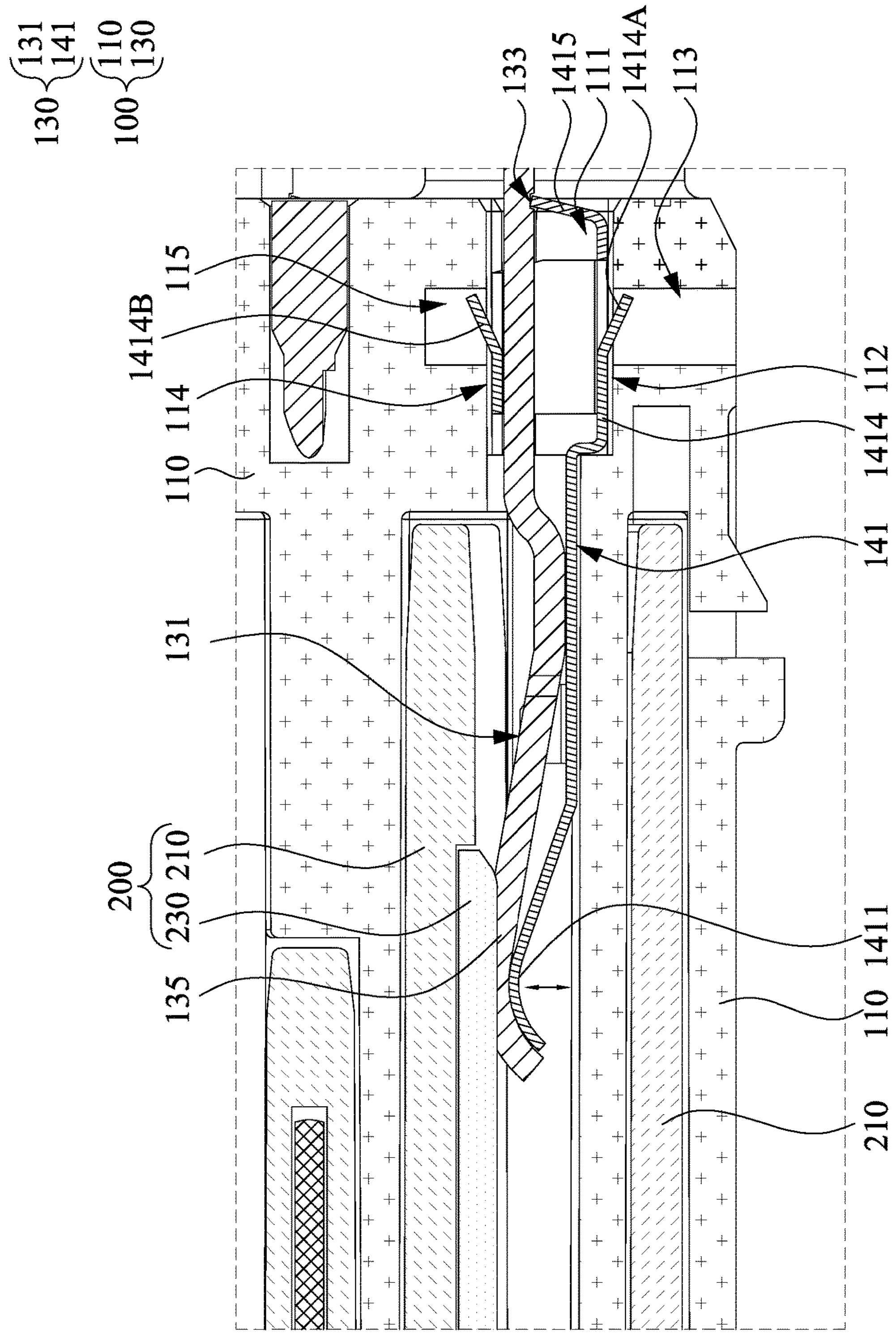
FIG. 7 is a cross-sectional view of the electrical connector of FIG. 2 when being electrically coupled with a mating connector.

FIG. 7 is a cross-sectional view of the electrical connector 100 of FIG. 2 when being electrically coupled with a mating connector 200. The mating connector 200 may be a male connector configured to couple with the electrical connector 100. The mating connector 200 has a base 210 a contact 230. When the mating connector 200 and the electrical connector 100 are mated, the contact 230 is in electrical contact with the contact end 135 of the contact 131, in which the contact 131 is flexible and is placed under tension by the spring 141 so that the shaped region of the contact 131 rides over the leading end of the contact 230 and press against the bottom surface of the contact 230. Although FIG. 7 merely shows that the contact 230 abuts against the contact 131, the contact 131 may move slightly downwards due to the flexibility of the underlying spring 141.

Specifically, because the contact module 130 of the electrical connector 100 has the spring 141 to support the contact end 135 of the contact 131, the contact end 135 of the contact 131 can be suspended to ensure that the contact end 135 of the contact 131 is in electrical contact with the contact 230 of the mating connector 200. The spring 141 serves as a limiting fixture for the contact 131, and provides the contact 131 elastic support, thereby extending plug and unplug lifespan. Moreover, since the fixed portion 1414 of the spring 141 has the first and second barbs 1414A and 1414B, and the tunnel 111 of the base 110 has the stop recesses 113 and 115, the spring 141 and the contact 131 on the spring 141 can be positioned in the tunnel 111 of the base 110 by the first and second barbs 1414A and 1414B and the stop recesses 113 and 115 of the tunnel 111. The electrical connector 100 is convenient to assemble and its structure is stable and reliable, and can suppress electrical arcing between separated contacts during connection and disconnection without adding an additional connection and switching device.

In detail, the steps of the installation and the use of the present disclosure are:

a. the contact 131 is assembled to the spring 141 to form the contact module 130, and then the contact module 130 is inserted into the corresponding opening of the tunnel 111, such that the position limitation can be realized by the barbs and the stop recesses;

b. during the plugging process of the male and female connectors, the contact portion 1411 of the spring 141 can provide elastic support to the contact 131, such that the contact end 135 of the contact 131 can obtain better elasticity and better contact performance, thereby greatly increasing the plugging and unplugging lifespan of the male and female connectors.

Through the aforementioned configuration, the contact and the spring form the easy-to-assemble contact module, the first barb of the spring inserted into the terminal hole of the base and coupled with the stop recess realizes the assembly and the limiting of the entire contact module, and thus complex manufacturing processes can be decreased to simplify the assembly process of the product. In addition, the spring can not only be used as a limiting fixture between the contact and the base to ensure that the position of the contact in the base is stable, but also can provide elastic support for the contact, so that the contact can indirectly obtain better elasticity, thereby greatly increasing the plugging and unplugging lifespan of the product.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electrical connector, comprising:

a base having a plurality of tunnels; and a plurality of contact modules respectively embedded in the tunnels, wherein each of the contact modules comprises a contact and a spring, the spring is located in one of the tunnels and supports a contact end of the contact so that the contact end is suspended, and a back end of the spring has a fixed portion having a first barb, and the first barb engages a stop recess of a first tube wall of one of the tunnels, wherein the spring comprises a contact portion, an extending portion, a turning portion, and the fixed portion in sequence, the contact portion is suspended from a bottom wall of one of the tunnels and is formed at a front end of the spring, and the extending portion is at least flat against the bottom wall, and the spring is one-piece-formed by a metal plate.

2. The electrical connector of claim 1, wherein the fixed portion is in a form of an enclosed ring, and the enclosed ring forms a channel to enable the contact to pass through.

3. The electrical connector of claim 2, wherein a surface of the fixed portion in the form of the enclosed ring facing away from the first barb has a second barb, and the second barb hooks into a stop recess of a second tube wall of one of the tunnels.

4. The electrical connector of claim 2, wherein the contact has an ear portion abutting against a sidewall of the fixed portion in the form of the enclosed ring.

5. The electrical connector of claim 4, wherein an opening of the base has a groove corresponding to a shape of the ear portion.

6. The electrical connector of claim 1, wherein the spring comprises the extending portion behind the contact portion.

7. The electrical connector of claim 6, wherein each of two sides of the extending portion has a side wing extending in a direction away from the first tube wall.

8. The electrical connector of claim 7, wherein a back of the side wing has a guiding surface.

9. The electrical connector of claim 6, wherein the spring comprises the turning portion connects the extending portion and corresponding to a step structure of the base.

10. The electrical connector of claim 9, wherein a back of the turning portion connects the fixed portion, and the fixed portion is at least partially flat against the first tube wall.

11. The electrical connector of claim 1, wherein a back of the fixed portion connects a tail portion, and the tail portion extends upward into a positioning recess of a surface of the contact.

12. The electrical connector of claim 1, wherein the contact end of the contact has a curved structure, and the contact portion of the spring has a curved structure abutting against the curved structure of the contact end of the contact.

13. The electrical connector of claim 1, wherein a surface of the fixed portion facing away from the first barb has a second barb that is aligned with the first barb along a vertical direction.

14. An electrical connector, comprising:

a base having a plurality of tunnels; and a plurality of contact modules respectively embedded in the tunnels, wherein each of the contact modules comprises a contact and a spring, the spring is located in one of the tunnels and supports a contact end of the contact so that the contact end is suspended, and a back end of the spring has a fixed portion in a form of an enclosed ring, and the enclosed ring forms a channel to enable the contact to pass through.

15. The electrical connector of claim 14, wherein the contact has an ear portion abutting against a sidewall of the fixed portion in the form of the enclosed ring.

16. The electrical connector of claim 15, wherein an opening of the base has a groove corresponding to a shape of the ear portion.

17. The electrical connector of claim 14, wherein a front end of the spring comprises a contact portion suspended from a bottom wall of one of the tunnels, and the spring comprises an extending portion behind the contact portion and at least flat against the bottom wall.

18. The electrical connector of claim 17, wherein each of two sides of the extending portion has a side wing extending in a direction away from a first tube wall of one of the tunnels.

19. An electrical connector, comprising:

a base having a plurality of tunnels; and a plurality of contact modules respectively embedded in the tunnels, wherein each of the contact modules comprises a contact and a spring, the spring is located in one of the tunnels and supports a contact end of the contact so that the contact end is suspended, and a back end of the spring has a fixed portion having a first barb, and the first barb engages a stop recess of a first tube wall of one of the tunnels, a back of the fixed portion connects a tail portion, and the tail portion extends upward into a positioning recess of a surface of the contact.

* * * * *